Oct. 16, 1962    R. C. LASSIAT    3,058,236
SEPARATING GAS FROM GRANULAR SOLIDS
Filed April 27, 1961
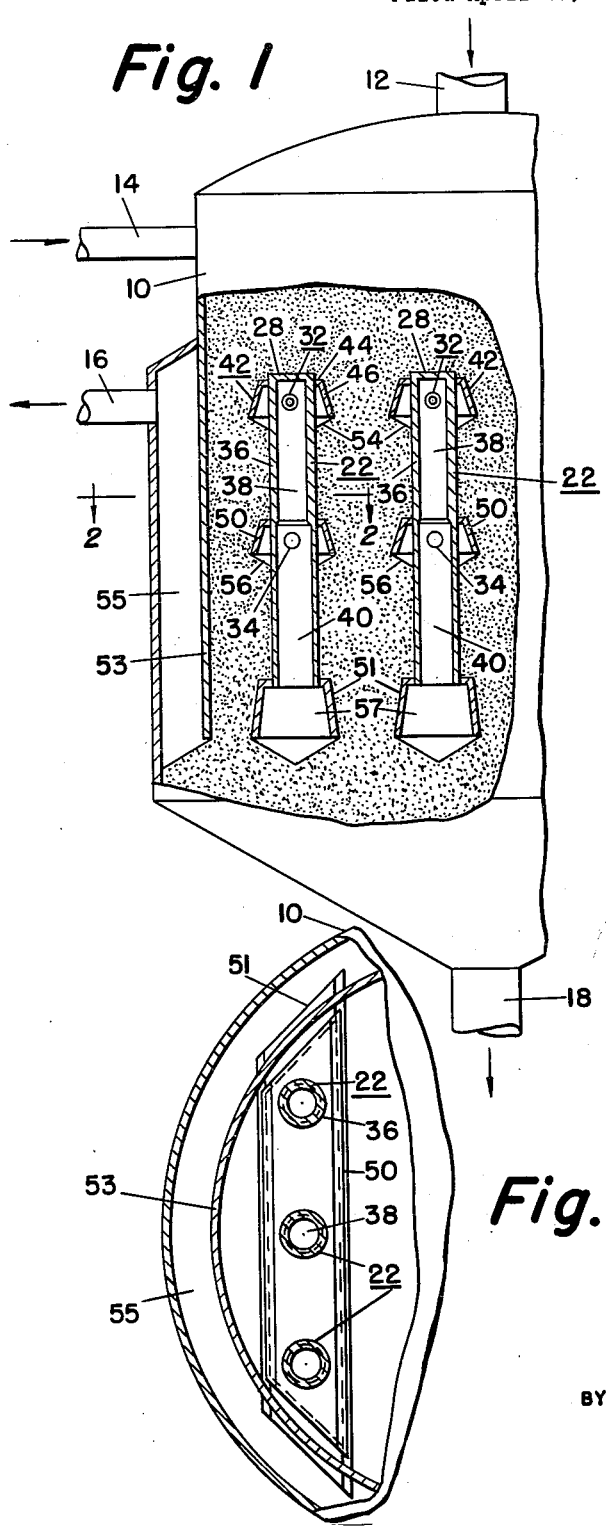
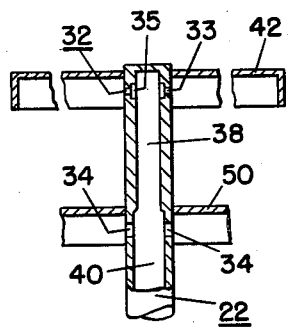
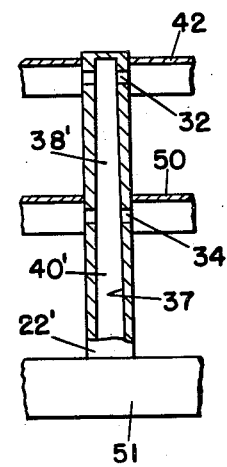
INVENTOR.
RAYMOND C. LASSIAT, DECEASED
BY ADELE LASSIAT, ADMINISTRATRIX
BY Robert D. Spindle
ATTORNEY ns. No. 107,000
United States Patent Office
3,058,236
Patented Oct. 16, 1962

3,058,236
SEPARATING GAS FROM GRANULAR SOLIDS
Raymond C. Lassiat, deceased, late of Swarthmore, Pa., by Adele Lassiat, administratrix, Swarthmore, Pa., assignor to Sun Oil Company, Philadelphia, Pa., a corporation of New Jersey
Filed Apr. 27, 1961, Ser. No. 107,000
2 Claims. (Cl. 34—168)

In various commercial processes, granular solid material is employed as a moving compact bed for the contacting of gaseous or vaporous materials in order to bring about some physical action or chemical reaction in the gaseous material. The gaseous material is then separated from the granular solid material, and various collecting systems have been used previously to accomplish the separation. The gas is thoroughly distributed within the compact bed, and suitable apparatus is provided for collecting the gas from the various parts of the bed.

In the catalytic conversion of hydrocarbons, e.g., catalytic cracking of higher boiling point petroleum hydrocarbons in order to form gasoline, one of the principal processes employed involves the use of a compact moving bed of granular catalysts, the petroleum reactants being introduced into the bed at one level and the reaction products being withdrawn from the bed at another level.

In order to separate the gas from the granular solids in such processes, a plurality of vertical gas-collecting pipes have been employed in the vessel, the pipes being distributed uniformly over the cross section of the vessel. Baffles associated with the gas collecting pipes are employed in order to cause the bed of solids surrounding the pipes to be deflected away from the pipes at a plurality of vertically spaced levels and to form, between the lower ends of the baffles and the pipes, upper bed surfaces at which gas disengages from the bed and enters a gas space between the baffle and the pipe. From this space the gas passes through orifices or apertures in the side wall of the pipe, flows downwardly through the pipe into a gas chamber beneath the pipe, and leaves the vessel through a gas outlet communicating with the gas chamber.

It has been found in commercial practice that erosion of the inner surfaces of the side wall of the gas collecting pipes takes place. Frequently it is found that the erosion occurs in a surprisingly localized manner at a level slightly above the apertures in the pipe which are at the next to highest level at which apertures are provided. It has been found that the cause of this erosion is the formation of a gas vortex or eddy within the pipe by the gas passing downwardly from the level of the uppermost apertures in the pipe. The eddy consists of a rapidly rotating current of gas in a horizontal plane. The catalyst dust, which is carried in small amounts into the pipe by the gas, becomes concentrated in the eddy and exerts an abrasive action which cuts deeply into the pipe wall in a narrow band slightly above the next to highest aperture and in time cuts completely through the wall at that location.

The present invention provides novel apparatus and process whereby the undesirable erosion characterizing the prior art operation is eliminated. The invention will be more fully described with reference to the attached drawing wherein FIGURES 1 and 2 are plan and elevation views respectively of one embodiment of the invention, FIGURE 3 is a partial side elevation view of that embodiment, and FIGURE 4 is a partial elevation view of another embodiment of the invention.

Referring to FIGURES 1, 2 and 3, the numeral 10 represents a vessel for the contacting of granular solids as a moving compact bed, with a gaseous or vaporous material, e.g., petroleum hydrocarbons which are to be catalytically cracked by contact with the granular solid catalyst. The vessel has a solids inlet 12, a gas inlet 14, a gas outlet 16 and a solids outlet 18.

A plurality of gas collecting pipes 22 are positioned within the vessel. Each of the pipes 22 has a closed upper end 28, and also has two opposed apertures 32 at an upper level and two opposed apertures 34 at a lower level. As shown in FIGURE 3, each aperture 32 has an outer, relatively small portion 33 and an inner, enlarged portion 35. Each of the pipes 22 has in an upper portion thereof a thickened wall 36, which provides a channel 38 having smaller cross section than the channel 40 in the lower portion of the pipe.

Baffles 42, in the form of inverted troughs, extend horizontally across the vessel near the level of the upper apertures 32 in pipes 22. The baffles have upper portions 44 which extend outwardly from the pipe and outer portions 46 which extend downwardly to a level beneath the upper apertures 32. Similar baffles 50 are provided in association with the lower set of apertures 34.

The pipes 22 communicate at their lower ends with baffles 51, in the form of inverted troughs, which extend through the wall 53 into the annulus 55 between wall 53 and the wall of vessel 10, and which form gas chambers 57 communicating with the lower ends of pipes 22.

In operation, the gas which disengages from the upper surfaces 54 and 56 of the compact beds surrounding the pipes, enters the pipes through the apertures at the respective levels and passes downwardly through the pipes. The gas which enters the upper apertures 32 passes downwardly through the channel 38. The gas which enters through the apertures 34 is mixed with the gas from above, and the mixture passes down through the channel 40. As subsequently more fully described, the provision of a channel 38 having smaller cross section than channel 40 prevents the gas introduced through the apertures 32 from assuming a horizontal eddy flow pattern within the pipe. The gas therefore passes through the channel 38 as a substantially nonvortical stream, and erosion of the wall by eddying solids is prevented. The gas passes from channel 40 into the gas chambers 57 beneath the channels 51. The gas passes through channels 51 into annulus 55 and is withdrawn through outlet 16.

A typical construction of a gas collecting pipe for use according to the invention involves the use of a pipe which is about 30 inches high and has an upper set of apertures 1½ inches below the top of the pipe, and a lower set of apertures 16 inches below the top of the pipe. The upper apertures have 13/32 inch diameter in the outer part 33 and ¾ inch diameter in the inner part 35. The lower apertures have 9/16 inch diameter. The upper channel 38 of the pipe has inside diameter of about 1.5 inches, and extends downwardly to a level about 1.5 inches above the centerline of the apertures 34. The lower channel 40 has inside diameter of about 2 inches.

In place of the trough-like baffles 42 and 50 as shown in the drawing, individual inverted cup-like baffles for each gas-collecting pipe can be employed, as well known in the art.

In place of the baffles 51 as shown in the drawing, other means, as well known in the art, can be employed for conveying the gas from the lower ends of the pipes 22 to the outlet 16. For example, the means employed in J. E. Evans Patent No. 2,661,322, issued December 1, 1953, for conveying gas from the lower ends of the gas-collecting pipes 4 to the outlet 2, can be employed.

Provision of an upper channel 38 having lesser cross sectional area than that of the lower channel 40 prevents the horizontal eddy formation which frequently occurs when the pipe has uniform inner diameter throughout. The smaller diameter of the channel 38, as compared with that of channel 40, results in more nearly equal gas velocities in the respective channels than in the case of uniform pipe diameter throughout, and results in the elimination of the eddy which forms when the difference in velocities between the two channels is greater.

In typical operation of the apparatus illustrated in the drawing, about 37% of the total gas flow into the pipe 22 is through the upper orifices 32, the remaining 63% being through the lower orifices 34 having 9/16 inch diameter. In operation according to the invention, at least about 15% of the total gas flow passes through the upper orifices, since if the amount is below 15%, the undesirable eddy appears, even with the reduced-diameter channel 38 in the upper portion of the pipe 22. If the reduced-diameter channel is absent, and the pipe has about 2 inch inner diameter throughout, the diameter of the upper apertures 32 each being 13/32 inch throughout, the eddy occurs whenever 42% or less of the total gas flow is through the upper orifices, so that in typical operation with 37% of the gas flow being through the upper orifices, the eddy is present, with detrimental results as noted previously.

In the above example, the ratio of the inner cross sectional area of the upper channel 38 to the inner cross sectional area of the lower channel 40 is about 0.5625 to 1. Preferably, according to the invention, this ratio is in the range from 0.4 to 0.75, though other ratios can be used in some cases.

In the above example, the ratio of the linear velocity of gas in the upper channel 38 to the linear velocity of gas in the lower channel 40 is about 0.657 to 1, as calculated from volumetric flow rates of 37 and 100 respectively for the upper and lower channels and from the cross sectional areas of the respective channels. Preferably, according to the invention, this ratio is in the range from 0.5 to 0.8, though other ratios can be used in some cases.

In FIGURE 4, a modified embodiment of the invention is illustrated wherein the pipe 22' has an inner sidewall 37 with gradually upwardly decreasing diameter. The portion of the pipe 22' between the apertures 32 and 34 constitutes an upper channel 38', and the portion between the apertures 34 and the baffle 51 constitutes a lower channel 40'. This embodiment gives generally similar results to those obtained with the embodiment shown in FIGURE 3. Preferably, in the FIGURE 4 embodiment, the ratio of the inner cross sectional area of the upper channel 38', as calculated from the average diameter of that channel, to the inner cross sectional area of the lower channel 40', as calculated from the average diameter of the latter channel, is in the range specified previously. Also, preferably, the ratio of the velocities in the respective channels, similarly calculated, is in the range specified previously for velocity ratio.

It is not necessary according to the invention that the upper apertures 32 have inner and outer portions with different diameters, as in the embodiment of FIGURE 3, and upper apertures 34 having uniform diameter throughout, as in the FIGURE 4 embodiment, can be employed.

The upper apertured area and the lower apertured area provided by the apertures 32 and 34 respectively, may each contain one or more individual apertures. Preferably, but not necessarily, the total aperture area at the upper level, as measured at the most constricted location, e.g., the outer apertures 33 in FIGURE 3, is less than, and more probably within the range from 0.25 to 0.75 times, the total aperture area at the lower level.

The invention claimed is:

1. Apparatus for separating gas from granular solids which comprises: a vessel; a plurality of gas-collecting pipes therewithin, each pipe having a closed upper end and having an apertured area in an upper portion of the sidewall thereof and a second apertured area at a lower level in the sidewall thereof, each pipe having smaller inner cross sectional area between the level of the first-named apertured area and the level of the second apertured area than beneath the level of the second apertured area; and means for conveying gas from the lower ends of the pipes to the exterior of the vessel; whereby gas disengages from a compact bed of solids surrounding each gas-collecting pipe, enters the apertures therein, passes downwardly through the pipes as substantially non-vortical streams, and is removed from the vessel.

2. Apparatus according to claim 1 wherein a baffle is secured to each pipe at a level above each of the apertured areas and extends outwardly from the pipe at that level and downwardly to a level beneath the apertured area, whereby gas disengages from the compact bed of solids at a bed surface between the pipe and the lower end of the baffle.

References Cited in the file of this patent

UNITED STATES PATENTS

| | | |
|---|---|---|
| 2,400,194 | Day | May 14, 1946 |
| 2,661,322 | Evans | Dec. 1, 1953 |
| 2,748,060 | Hicks | May 29, 1956 |
| 2,776,876 | Bowles | Jan. 8, 1957 |
| 2,946,345 | Weltmer | July 26, 1960 |